United States Patent [19]

Weiman

[11] Patent Number: 5,063,604
[45] Date of Patent: Nov. 5, 1991

[54] METHOD AND MEANS FOR RECOGNIZING PATTERNS REPRESENTED IN LOGARITHMIC POLAR COORDINATES

[75] Inventor: Carl F. R. Weiman, Westport, Conn.

[73] Assignee: Transitions Research Corporation, Danbury, Conn.

[21] Appl. No.: 434,100

[22] Filed: Nov. 8, 1989

[51] Int. Cl.$^5$ .............................................. G06K 9/36
[52] U.S. Cl. ..................................... 382/41; 364/731; 382/16
[58] Field of Search ..................... 382/41, 43, 10, 16, 382/25; 364/725, 731, 826; 358/140

[56] References Cited

U.S. PATENT DOCUMENTS

| | | | |
|---|---|---|---|
| 3,069,654 | 12/1962 | Hough | 382/41 |
| 3,952,187 | 4/1976 | Robinson et al. | 364/731 |
| 4,267,573 | 5/1981 | Chaikin et al. | 382/46 |
| 4,415,928 | 11/1983 | Strolle et al. | 364/731 |
| 4,434,437 | 2/1984 | Strolle et al. | 364/731 |
| 4,500,972 | 2/1985 | Kuhn et al. | 364/731 |
| 4,618,989 | 10/1986 | Tsukune et al. | 382/41 |
| 4,731,860 | 3/1988 | Wahl | 382/41 |
| 4,736,436 | 4/1988 | Yasukawa et al. | 382/23 |
| 4,843,631 | 6/1989 | Steinpichler et al. | 382/43 |

OTHER PUBLICATIONS

"A Real-Time Processor for the Hough Transform", IEEE Transaction on Pattern Analysis and Machine Intelligence, vol. 10, No. 1, 1/88 K, Hanahara.
"Digital and Optical Shape Representation and Pattern Recognition", A Reprint from the Proceedings of SPIE—The International Society for Optical Engineering, vol. 938, Apr. 1983 by C. F. R. Weiman.
"Use of the Hough Transformation to Detect Lines and Curves in Pictures", Graphics and Image Processing, Communications of the ACM, Jan. 1972, vol. 15, No. 1 by R. Duda et al.
"A Monolithic Hough Transform Processor Based on Restructurable VLSI", IEEE Transactions on Pattern Analysis and Machine Intelligence, vol. 10, No. 1, Jan. 1988, by F. Rhodes et al.

Primary Examiner—David K. Moore
Assistant Examiner—Joseph Mancuso
Attorney, Agent, or Firm—Perman & Green

[57] ABSTRACT

Image processing method and apparatus wherein candidate points are first selected in a log-polar image domain. The points may be selected by edge detection, thresholding, or any method suitable for identifying image points which are likely to lie on some feature of interest. For every candidate point there is drawn, also in the log-polar domain, a mirror image of a curve that represents the log-polar image of a straight line. There is accumulated a log-polar domain histogram of "hits" from the drawing process. Finally, a peak bin is selected. The position of the peak bin corresponds to the position of the recognized line.

25 Claims, 7 Drawing Sheets

FIG.1a
(PRIOR ART)

CARTESIAN DOMAIN

FIG.1b
(PRIOR ART)

HOUGH DOMAIN

FIG.1c
(PRIOR ART)

LOG-POLAR DOMAIN

FIG.1d

LOG-HOUGH DOMAIN

FIG. 5a
LOG-POLAR IMAGE

FIG. 5b
HOUGH TRANSFORM ACCUMULATOR

FIG. 2

Z-PLANE

A) SENSOR ARRANGEMENT

W-PLANE

B) COMPUTATION SPACE

LOG HOUGH TRANSFORM

CARTESIAN CONSTRUCTION OF
"IN PLACE" HOUGH TRANSFORM

METHOD AND MEANS FOR RECOGNIZING PATTERNS REPRESENTED IN LOGARITHMIC POLAR COORDINATES

FIELD OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention relates generally to image processors and, in particular, to image processing method and apparatus operating on image data which is represented in logarithmic polar coordinates.

BACKGROUND OF THE INVENTION

The Hough transform is a widely known and effective method for detecting and measuring extended straight lines in images in the presence of noise and discontinuities.

In U.S. Pat. No. 3,069,654, issued Dec. 18, 1962, "Method and Means for Recognizing Complex Patterns", P.V.C. Hough discloses method and apparatus for dividing a viewed image representation into sufficiently small sectors such that a complex pattern is divided into substantially straight line segments. Each straight line segment is detected and transformed into slope-intercept data for detecting the presence of patterns within the image.

Figure 1A:
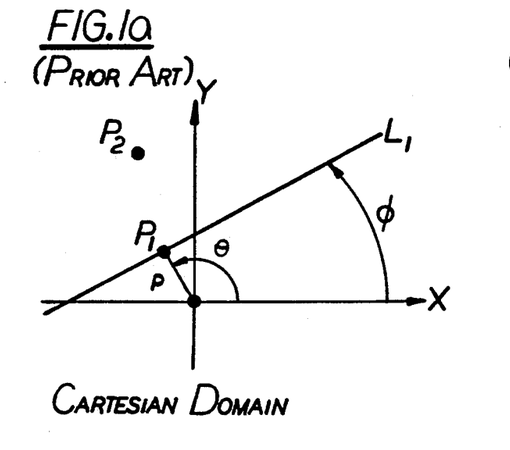
FIGS. 1a-1c illustrate three prior art image transform domains, including the Cartesian (FIG. 1a), Hough (FIG. 1b) and Log-Polar (FIG. 1c)
Figure 1B:
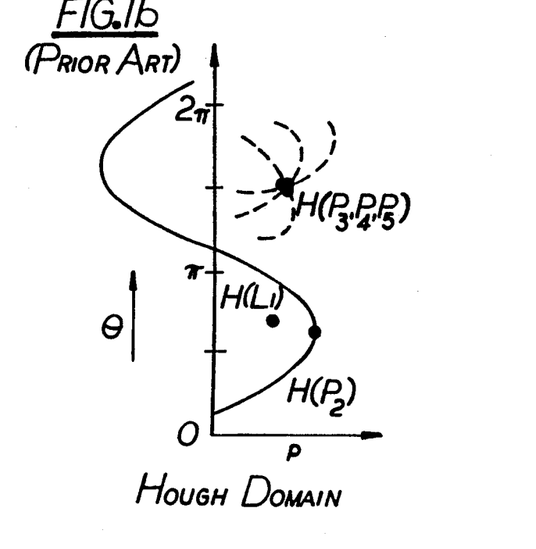

In Duda and Hart's classical formulation of the Hough transform for Cartesian image domains ("Use of the Hough Transform to Detect Lines and Curves in Pictures", Communications of the ACM, pp.11-15, January, 1972) a straight line ($L_1$ in FIG 1a) is transformed into a point ($H(L_1)$ in FIG. 1b) in a space whose coordinates are the orientation and position parameters of the line. A point in the Cartesian domain ($P_2$ in FIG. 1a) is transformed into a Hough domain sine curve ($H(P_2)$ in FIG. 1b) whose constituent points correspond to the orientation-position combinations consistent with all possible lines through the Cartesian domain point. A set of Cartesian domain points transforms to a set of Hough domain sine curves, which intersect at a single point if the Cartesian points are collinear.

Points $P_3$, $P_4$, and $P_5$ in FIG. 1a are collinear; their corresponding sine curves in FIG. 1b intersect at the point labelled $H(P_3, P_4, P_5)$. Thus, a duality relates Cartesian domain points to Hough domain sine curves, and Hough domain points to Cartesian domain straight lines. The Cartesian and Hough domains are distinct entities with distance geometries. The Hough domain serves as a two dimensional histogram which sorts candidate points based on the families of lines with which they are consistent, and statistically pools collinear Cartesian points by tallying coincident loci of their corresponding sine curves. Maximal peaks correspond to the recognized lines.

In U.S. Pat. No. 4,267,573, issued May 12, 1981, "Image Processing System", G. Chaikin and the present inventor disclose an image processing system having imaging sensors arranged in a polar exponential array geometry. This sensor geometry, also known as log spiral, conformal logarithmic and polar exponential grid (PEG) has been successfully applied in a number of imaging applications.

In an article entitled "Exponential Sensor Array Geometry and Simulation" presented at a conference on Digital and Optical Shape Representation and Pattern Recognition, Proceedings of SPIE, Apr. 4-6, 1988, the present inventor discusses the geometric relations between polar exponential sensor geometry and ordinary Cartesian image sensor geometry The conversion between ordinary Cartesian image coordinates and the natural log-polar coordinate of polar exponential sensor arrays is termed "log-polar mapping" hereinafter, and imagery represented in such coordinates is termed "log-polar imagery".

Despite the great utility of the Hough transform and known variants thereof for image processing applications several disadvantages are known to exist. One significant disadvantage relates to an inability to apply the Hough transform locally, such as directly at a plane of image sensors. Instead, electronic buses and other circuitry are required to export the image data to off-sensor plane image processing electronics for Hough transform processing.

Another disadvantage of the Hough transform is that the Hough transform coordinate system is totally different than the image coordinate system. Thus, there must be computational conversion between the two coordinate systems. Furthermore, the inherently discrete sampling properties of the image sensor transform to complicated digitization errors in the Hough representation.

It is thus an object of the invention to provide a geometric coordinate representation which is identical for both image and Hough domains, and a simplified method for executing a Hough transform within this unified coordinate system.

It is another object of the invention to provide for a simplification of image processing apparatus and method over conventional Hough transform-related techniques.

It is another object of the invention to provide apparatus and method for executing a log-Hough transform technique.

It is another object of the invention to provide a log-Hough transform method and apparatus that is amenable to integrated circuit fabrication techniques for "in-place" local image processing that eliminates a requirement for buses to export data away from image sensors to an external Hough domain.

SUMMARY OF THE INVENTION

The foregoing problems are overcome and the objects of the invention are realized by method and apparatus that modifies the Hough transform for application to log-polar coordinate imagery. Log-polar mapping has been found to unify the geometry of the image domain and the Hough domain, thus simplifying the Hough algorithm. Histogram bins are superimposed directly on the image domain, facilitating immediate construction of inferred lines. The use of the invention also beneficially eliminates slope quantization asymmetries. The teaching of the invention shows that the Hough transform is more naturally matched to log-polar mapped imagery than to conventional Cartesian imagery. Thus, the use of the methods and apparatus of the invention provides for greater image processing performance to be achieved with less complex image processing hardware and algorithms.

In accordance with the invention, for the log-Hough transform the corresponding sequence of steps takes place entirely in the log-polar image domain.

In accordance with the invention candidate points are first selected in the log-polar image domain. The points may be selected by edge detection, thresholding, or any other conventional method for identifying image points which are likely to lie on some feature of interest. For every candidate point there is drawn, also in the log-polar domain, a mirror image of a curve that represents the log-polar image of a straight line. There is accumulated a log-polar domain histogram of "hits" from the drawing process. Finally, a peak bin is selected. The position of the peak bin corresponds to the position of the recognized line.

In accordance with a presently preferred hardware embodiment constructed in accordance with the invention image data is presented and stored in log-polar format. The stored data is first processed by a local pixel neighborhood operator or filter, such as a $3 \times 3$ filter, to identify high contrast points or pixels within the image. A differential movement Look Up Table (LUT) stores the shape of a construction curve, that is the mirror image of the log-polar representation of a straight line. An output of the $3 \times 3$ filter is a value that indicates the strength of an edge at the center of the $3 \times 3$ area. If the edge strength exceeds a programmable threshold, a transform construction process is initiated. An Edge Scan Address Generator generates addresses for reading out the input Array while the array data is provided to serial shift registers for application to the edge detector. A Threshold Register stores a predetermined threshold value for input to an Edge Level Comparator. Another input to the Comparator is the output of the edge detector. The Comparator compares the two inputs to determine when the predetermined edge threshold value is exceeded and causes a control logic block to initiate an operation wherein a Hough transform log-line is written to an Output Memory Array wherein intersections are accumulated. The Hough transform process increments the contents of each pixel in an Output Memory Array. The address from the Edge Scan Address Generator is employed to load, when the Comparator indicates the presence of a pixel having a value that exceeds the threshold value, a U address counter and a V address counter. The U and V address counters generate addresses for the Output Memory Array during the transform process. A Transform Path Counter is initialized to zero and counts up, 1 count per clock cycle, until a required number of transform path points are counted. If the U-V address is within the Output Memory Array address space the corresponding content of the Array is read, incremented by 1 and written back to the same location within the Output Memory Array. This operation corresponds to accumulating values in bins of a histogram. At the completion of the process the bin having the highest value is associated with a position of a feature of interest in the image.

BRIEF DESCRIPTION OF THE DRAWING

The above set forth and other features of the invention will be made more apparent in the ensuing Detailed Description of the Invention when read in conjunction with the attached Drawing, wherein:

FIG. 5b illustrates the content of the Hough transform accumulator of FIG. 6 in response to the input of FIG. 5a;

FIG. 7b is a flow chart illustrating in greater detail the step of Constructing Features of Interest of FIG. 7a.

DETAILED DESCRIPTION OF A PREFERRED EMBODIMENT OF THE INVENTION

The method and apparatus of the invention may be employed for detecting straight lines and certain algebraic curves such as conic sections present in image or other multi-dimensional data. Other examples of multi-dimensional data include any set of measurements in which observations are indexed by more than one variable. For example, in an experiment whose outcome is a one dimensional value, the experimental environment may be set up to control two or more variables. A systematic relationship between the outcome of the experiment and the combination of control variables is an example of a pattern or feature of interest.

By example, the invention detects extended features of interest in image data, the features including straight and curved lines, circles through the origin of a logarithmic polar coordinate system and parabolas or hyperbolas whose focuses are at the origin of the logarithmic polar coordinate system. Thus, although the disclosure presented below is given in the context of image processing applications those versed in the art will realize that the teaching of the invention is applicable in general to any multi-dimensional data which can be represented in logarithmic polar coordinates.

Figure 1C:
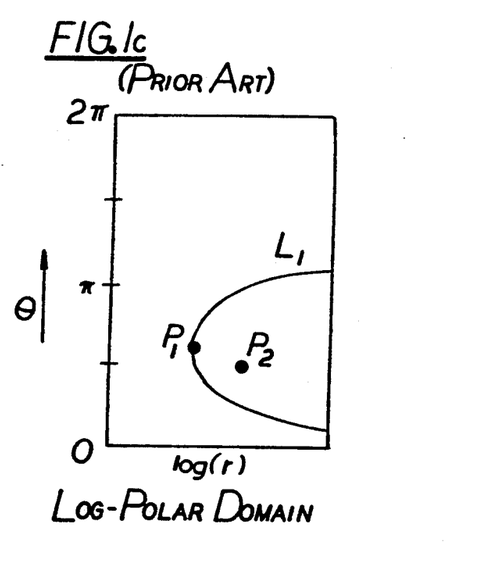
Figure 1D:
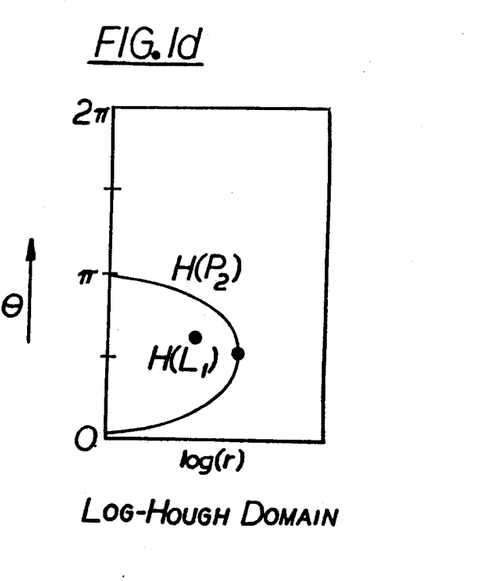
FIG. 1d illustrates, in accordance with the teaching of the invention, a Log-Hough Domain.

As is illustrated in FIG. 1c in a log-Hough transform objects of recognition are Cartesian straight lines, but viewed in log-polar coordinates (L1 in FIG. 1c). As is shown below the log-Hough dualities between curves and points in FIGS. 1c and 1d are geometric mirror images of each other. That is, the log-Hough domain is geometrically identical to the log-polar image domain. As a preliminary step there is first developed below the relevant geometry of the log-polar mapping of Cartesian straight lines below.

LOG-POLAR IMAGE OF STRAIGHT LINES AND CIRCLES

Figure 2:
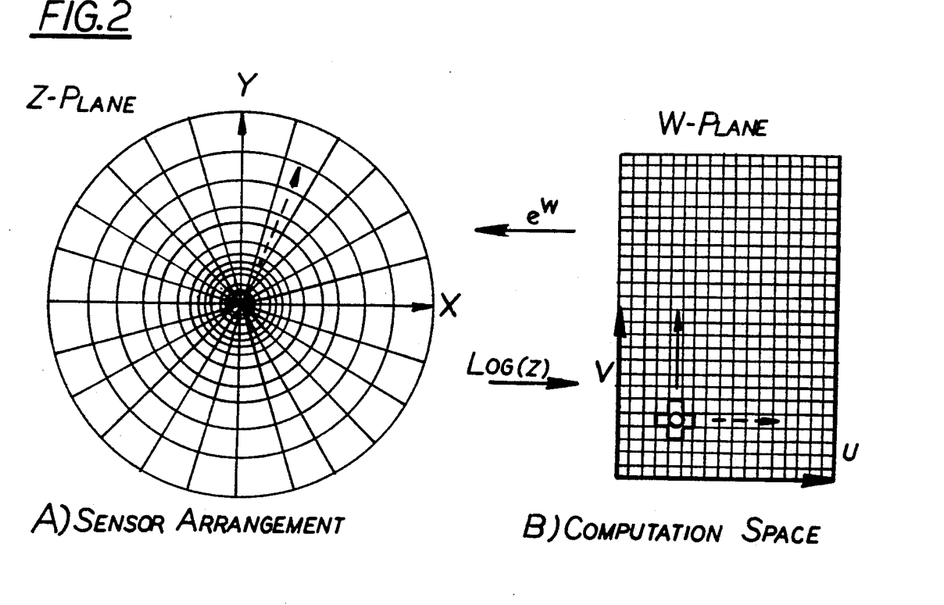
FIG. 2 illustrates a Log-Polar sensor array and a corresponding computational space of the prior art.

FIG. 2 illustrates the geometry of the log-polar mapping, which can be expressed as a coordinate change from (x,y) to (u,v) where $$(u,v) = (\log(\sqrt{x*x+y*y})), \arctan(y/x)) \tag{1}$$

The name "log-polar" derives from the observation that "u" in equation (1) is log(r) and "v" is theta in traditional polar coordinates. Expressing equation (1) as a conformal mapping, $$w = \text{Log}(z), (w=u+iv, z=x+iy) \tag{2}$$

clarifies the expression of numerous interesting geometric properties useful in, for example, robot vision. It should be noted that rotation by angle phi in the Cartesian domain corresponds to adding phi to v in the log-polar domain, and zoom in the Cartesian domain corresponds to adding the log of the zoom factor to u. That is, $$(\log(kr), theta+phi) = (\log(k)+\log(r), v+phi) \tag{3}$$

The Cartesian straight line is the object of recognition by the Hough transform. The polar coordinate equation of a straight line with slope tan(phi) and closest distance from the origin, rho, (as in FIG. 1a) is $$r = rho * \csc(theta - phi), 0 < theta - phi < pi \tag{4}$$

Thus, from the discussion following equation (1) above the log-polar equation is $$u = \log(rho) - \log(\sin(v-phi)) \tag{5}$$

It is noted that scaling rho and rotating theta simply translates this curve in the log-polar domain as expected from equation (3).

In accordance with the invention, this translation is important in the construction of the log-Hough transform. The orientation and scale of this curve are invariant under all values of rho and phi. Hereinafter this curve, the log-polar image of a Cartesian straight line, is referred to as a log-line for brevity.

As can be seen in FIG. 1c the log-line L1 is concave to the right, and asymptotic to $$v-phi=0 \text{ and } v-phi=pi \tag{6}$$

The curvature of the log-line, sin(v−phi), is maximum at its leftmost point, $$u=\log(rho), v=pi/2+phi, \tag{7}$$

which is denoted as the apex of the log-line. Point P1 in FIG. 1c indicates the apex of log-line L1. The apex corresponds to the closest approach of the original Cartesian line to the origin, whose polar coordinates are in fact the Hough coordinates of the line in the classical Cartesian formulation. Continuing in this vein of terminology the apex of a Cartesian line is referred to as the closest point to the origin and, conversely, an apical line of a point is defined herein as the line whose apex it is. Similarly, in the log-polar domain the apical log-line of a point is the log-line whose apex the point is. That is, in FIG. 1c, point P1 is the apex of line L1; conversely, L1 is the apical line of point P1.

LOG-HOUGH TRANSFORM OF THE INVENTION

The classical Hough transform recognizes lines by histogramming parameter combinations consistent with isolated local observations of candidate points. The essential sequence of steps for the Cartesian Hough transform may be expressed as follows.

0) Present the image in Cartesian Coordinates.

1) Select candidate points in the Cartesian image domain (e.g. by edge detection).

2) For each candidate point, draw the Hough domain sine curve which corresponds to all lines through that point.

3) Accumulate a Hough domain histogram of "hits" from the drawing process.

4) Select the peak bins; their Hough domain coordinates are the polar coordinates of the apexes of the recognized lines.

5) Construct the recognized lines in the image domain by converting the Hough domain points from polar to Cartesian Coordinates, and drawing the lines through them which are perpendicular to the lines from them to the origin.

In accordance with the invention, for the log-Hough transform the corresponding sequence of steps takes place entirely in the log-polar image domain.

0') Present the image in log-polar coordinates.

1') Select candidate points in the log-polar image domain. The points may be selected by edge detection.

2') For every candidate point there is drawn, also in the log-polar domain, a mirror image of the point's apical log-line.

3') There is accumulated a log-polar domain histogram of hits from the drawing process of step 2'.

4') Next the peak bins are selected. The position of the peak bins corresponds to the apexes of the recognized log-lines.

5') Construct the recognized log-lines whose apexes are the peak bins.

As can be realized the log-Hough transformation taught by the invention is an "in-place" algorithm in the log-polar domain, with the obvious caveat that histogram data is to be distinguished from the image data. FIG. 1d depicts this separation by rising a copy of the log-polar domain of FIG. 1a; although the domains are actually superimposed. That is, H(L1) is identical to P1. This provides for improvement in efficiency in step 5') in comparison to step 5 of the conventional Hough transform.

Figure 3:
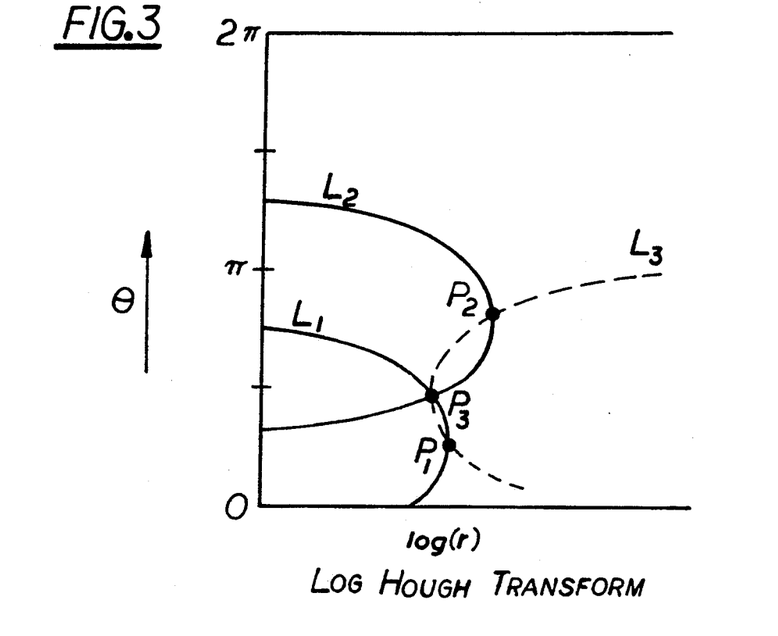
FIG. 3 graphically illustrates a method of the invention of recognizing a line by employing a Log-Hough transform.

FIG. 3 illustrates the execution of steps 1' through 5' as set forth above. Points P1 and P2 represent two candidate points selected in step 1'. Curves L1 and L2 are the corresponding mirror images of their apical log-lines drawn in step 2'. The histogram built from this construction in step 3' has a peak, detected by step 4', at the intersection P3 of curves L1 and L2. The point P3 serves as the apex of log-line L3 which is the unique log-line through points P1 and P2, constructed in step 5'.

Figure 4:
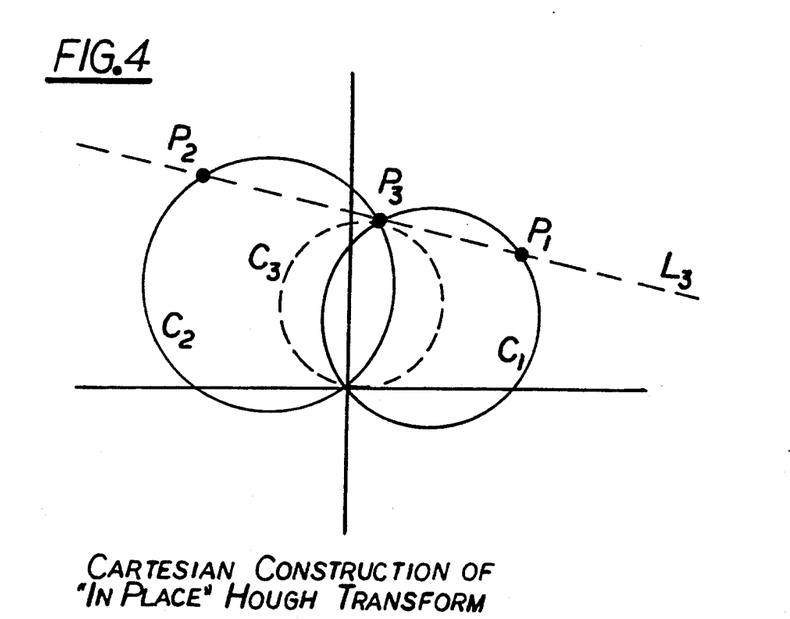
FIG. 4 illustrates a Cartesian interpretation of a Log-Polar domain construction.

The validity of the log-Hough transform can be derived from the Cartesian interpretation of the log-polar domain construction, as illustrated in FIG. 4. Curves L1 and L2 in FIG. 3 correspond to circles C1 and C2 in FIG. 4. That is, the mirror image of a log-line is the log-polar map of a circle whose diameter joins the origin and the apex of the corresponding Cartesian line. This can be proved by reversing the sign and offsetting to the apex (mirroring) in equation (5), yielding $$u = log(rho) + log(sin(v - phi))  \quad (8)$$

Inverting the log-polar map to get the Cartesian image yields $$r = rho * sin(theta - phi) \quad (9)$$

which is the polar coordinate equation of a circle of radius rho/2 through the origin and the apex of the Cartesian line. But this circle is the rho-theta orbit of the Hough sine wave corresponding to the apex in question, that is the set of polar coordinate solutions to the equation (1) of Duda and Hart, rewritten as $$r = rho * [sin(theta) * cos(phi) - cos(theta) * sin(phi)] \quad (10)$$

where rho and phi are the polar coordinates of the candidate point. These orbits intersect at the origin and at the apex of the common line through candidate points P1 and P2.

The preceding Cartesian construction process is an "in-place" (image domain) algorithm equivalent to the classical Hough transform. The circle with diameter through the origin and apex of a line may be referred to as an apical-circle of that apex. The Cartesian construction above expresses the fact that apical circles of collinear points all intersect at the origin and at the apex of the line of collinearity. This is an awkward computation in Cartesian coordinates. Construction of circles requires quadratic computation, and discretization near the origin would distort the histogram.

However, in the log-polar domain employed by the invention log-circles through the origin are mirror images of log-lines, all of which are identical in scale, orientation, and resolution. The histogram building construction requires but a single one-dimensional lookup table, which is basically the chain code of a log-line. No scaling is required, and there are no slope quantization effects. This simplification is one important point of novelty of the present invention over known Hough transform techniques and variations thereof.

The connection between log-polar and Hough domains may be geometrically interpreted as follows. The Hough domain is a polar coordinate representation of the apexes of lines in the Cartesian domain. The Hough domain sine wave is the orbit of apexes of all lines through a point. Taking the log of the rho dimension converts the sine wave to the mirror image of a log-line, i.e. equations (9) and (5). From the Cartesian domain, taking the log-polar mapping transforms lines into log-lines. Thus, the log-polar domain is functionally "halfway" between Cartesian and Hough domains. Applying the log-polar mapping to the Cartesian domain and log(rho) to the Hough domain unifies their geometries.

Figure 5A:
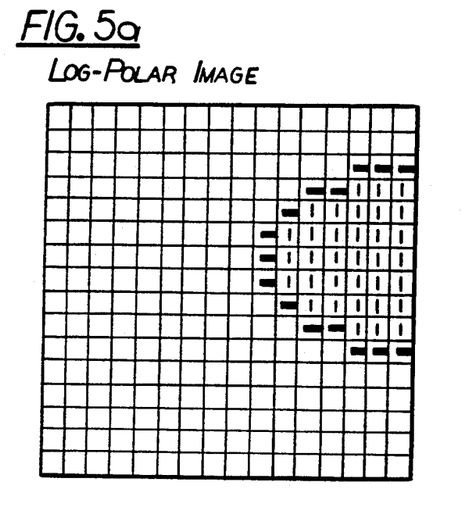
FIG. 5a illustrates a Log-Polar image that is input to the Log-Hough transform circuitry of FIG. 6.
Figure 6:
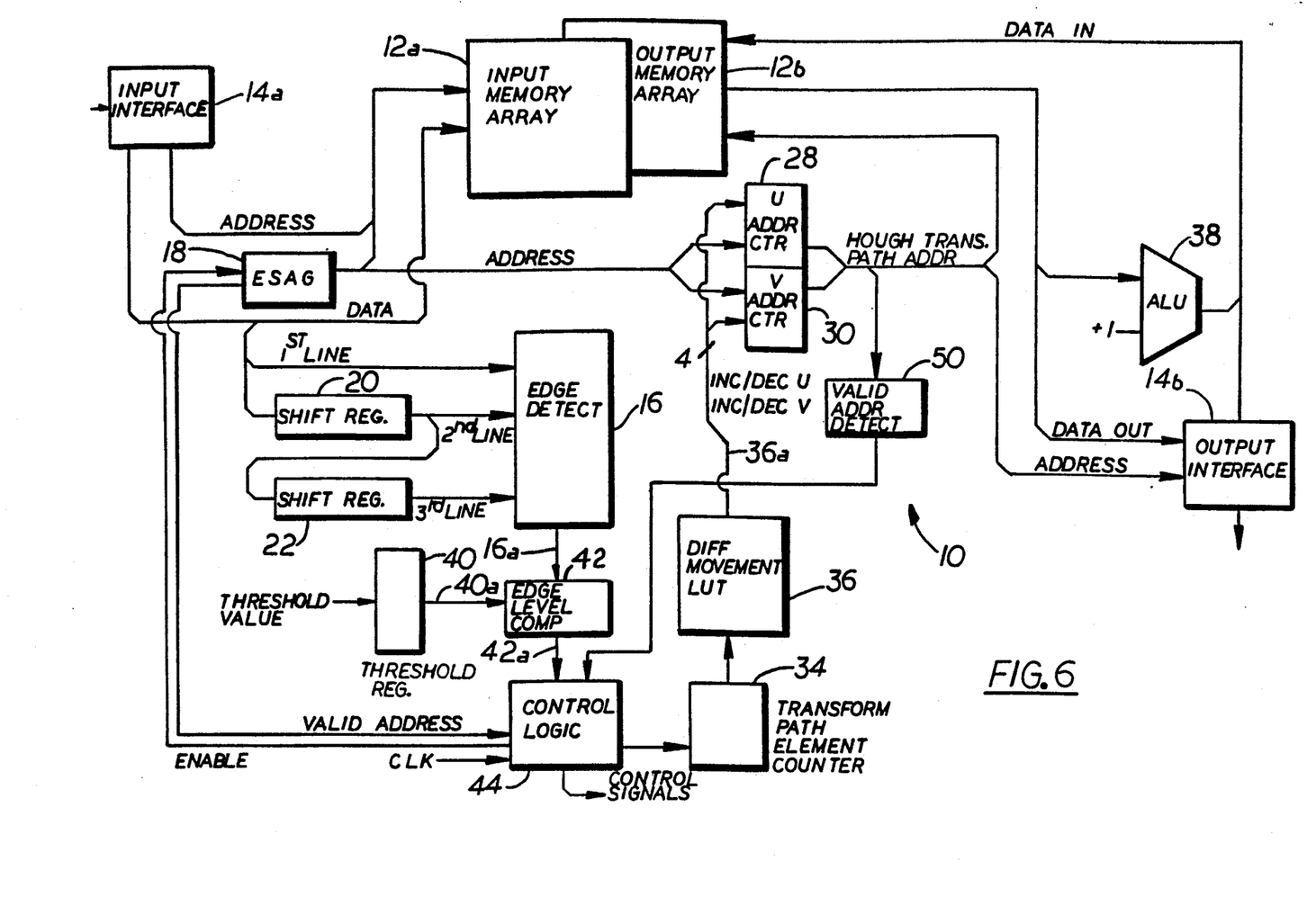
FIG. 6 illustrates in block diagram form one embodiment of circuitry, constructed in accordance with the invention, for implementing the Log-Hough transformation.

FIG. 6 is a block diagram of a presently preferred hardware system 10 constructed in accordance with the invention for accomplishing the log-Hough transform. The input to the system 10 is shown in FIG. 5a and is an image presented in log-polar format. Log-polar coordinates are the natural ray-ring coordinates in polar exponential CCD sensor arrays of a type disclosed in the proceedings of a conference presented by G. Sandini et al., "Retina-Like CCD Sensor for Active Vision", NATO Advanced Research Workshop on Robots and Biological Systems, Il Ciocco, Tuscany, Italy, June 1989. Log-polar mapping of conventional video images can also be implemented at typical frame rates via pixel address look-up tables and accumulator memories. Log-polar mapping on frame buffer contents may also be achieved by software which rearranges the positions of pixels in accordance with the required coordinate change. The log-polar image image may also be generated by conducting light from image points through an optic fiber bundle to photosensitive locations in a photosensor chip. The individual fibers of the fiber optic bundle are arranged so that Cartesian image points correspond to log-polar coordinetes at the photosensor chip. In this manner a conventional two-dimensional array of photosensors can be employed.

Figure 5B:
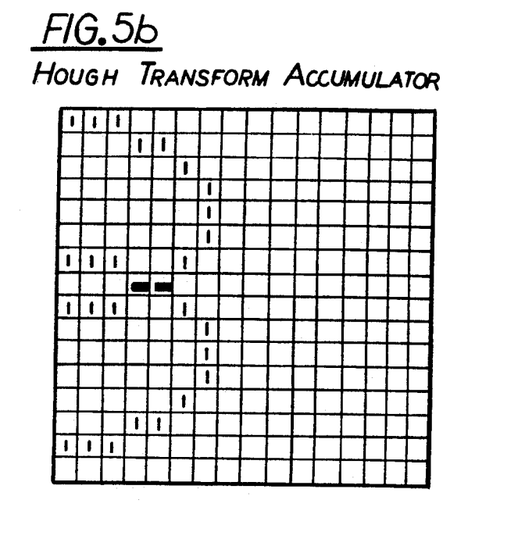

Whatever the source of log-polar image data, and as is described in detail below, the input log-polar image is first processed by a $3 \times 3$ or other suitable geometry pixel neighborhood operator to identify high contrast points. This initial processing function may be eliminated if the input log-polar image is a contour image such as a line drawing, blueprint, or the like. In this latter case candidate points are selected by threshold rather than $3 \times 3$ filter. The output of the system 10 is found in a Hough Transform Accumulator and is illustrated in FIG. 5b, wherein small dots indicate "hits" from the construction process. Larger dots indicate multiple hits corresponding to peak bins of the histogram. A differential movement Look Up Table (LUT) stores the shape of the construction curve (mirror image of log-line).

HOUGH TRANSFORM HARDWARE (FIG. 6)

An Input Memory Array 12a of $128 \times 128$ bytes stores images data that has been mapped to a log-polar format either by a CPU, or by dedicated mapping hardware through Input Interface 14a (corresponding to step 0' above). Representative input log-polar image data is shown in FIG. 5a.

The image data in the Array 12a is scanned for the presence of edges using a $3 \times 3$ matrix of coefficients that is multiplied with a $3 \times 3$ neighborhood of image data. Those familiar with the art will recognize that a $5 \times 5$, $7 \times 7$ or other sized neighborhood would also be suitable. The $3 \times 3$ size was selected because it can more efficiently be implemented in hardware. The resultant products are summed to generate a number that indicates the strength of an edge at the center of the $3 \times 3$ area (corresponding to step 1' above) If the edge strength exceeds a programmable threshold, a Hough transform process is initiated. This function may be implemented with an "edge detector" integrated circuit 16 such as a device known as a PDSP16401 manufactured by Plessey. An Edge Scan Address Generator (ESAG) 18 generates addresses for reading out the Array 12a such that the stored array data is provided to serial shift registers 20 and 22 for application to the edge detector 16. A Threshold Register 40 stores a predetermined threshold value for input to an Edge Level Comparator 42. Another input to comparator 42 is the output of edge detector 16. Comparator 42 compares a predetermined threshold value, from threshold register 40, with the edge strength output 16a of the edge detector 16 If the edge strength is greater than the threshold 40a the edge comparator output 42a signals Control Logic 44 to initiate a transform operation. The Control Logic 44 generates all of the required clock signals and enables to operate the counters, registers and memory arrays shown in FIG. 6. The Hough Transform operation writes a log-line to the output buffer, wherein intersections are accumulated. This aspect of the operation of the system 10 is described in detail below. The edge detection function may also be implemented with custom hardware, such as gate arrays or ASICs, or could be implemented in software executed by a computer such as a Digital Signal Processor (DSP). As such, the details of circuit implementation, such as the requirement for shift registers 20 and 22, may change.

The Hough transform process increments the contents of each pixel in an Output Memory Array 12b along a path that is the Hough transform of the detected edge point. The address output from ESAG 18 is employed to load two eight bit counters, specifically a U address counter 28 and a V address counter 30. The U counter 28 and the V counter 30 correspond to u and v in the equations presented supra. These two counters 28 and 30 generate an address for the 128×128 byte Output Memory Array 12b during the transform process. The data path is followed by controlling the movement of the U and V address counters 28 and 30. A Transform Path Counter 34 is initialized to zero and counts up, 1 count per clock cycle, until the required number of transform path points, 255 maximum for this implementation, are counted. The output of Counter 34 is employed to address a 256×4 bit Differential Movement LookUp Table (DM_LUT) 36. The 4 bit DM_LUT 36 output 36a controls the U and V address counters 28 and 30 to either hold, increment or decrement.

If the U-V address generated by counters 28 and 30 is within the Output Memory Array 12b address space, as detected by the valid ADDR detector 50, the corresponding content of the Array 32 is read, incremented by 1 by ALU 38, and written back to the same location within Array 12b (corresponding to steps 2' and 3' above). It should be noted that the Output Memory Array 12b is cleared, typically by a Host CPU (not shown), before the transform operation is initiated.

Step 4' above may be realized by reading out the contents of the buffer 12b through the Output Interface 14b to determine bins having maximum values, these bins corresponding to the apexes of recognized log-lines.

Although the input and output memory arrays 12a and 12b are shown as separate buffers, it is instructive to view them as a common memory element with input and output data contained in upper and lower data bytes. This aids in visualizing the results of the accumulation of data (intersections) in the output buffer. That is, the address of the peak values in the output buffer 12b is also the address of the apex of a corresponding line in the input buffer 12a. That is, both buffers express corresponding log-polar data and no translation between coordinate domains is required, as is the case with conventional methods.

With a 15 MHz clock source (CLK) a full edge scan of the Log-Polar Image for edges requires less than one millisecond. If ¼ of the pixels (8192/4=2048) result in a detected edge, an additional 9 milliseconds is required to complete the 2048 Hough transform paths, if each is 64 pixels in length.

It may be surprising to discover that log-polar mapping, which destroys the straightness of lines, is better suited for the Hough transform recognition of straight lines than Cartesian coordinates. As such, the significance of the teaching of the invention for image processing includes a number of important aspects. By example, software and hardware can be made much more efficient in that the number of pixels to be processed is reduced by factors ranging from 10-to-1 to 100-to-1 by the reduced resolution in the peripheral field of view. The separate Hough domain representation is eliminated. Scaling, that is, multiplication by rho in the Hough domain, is eliminated. Expensive hardware multipliers necessary in high performance systems for conventional Hough transforms, such as described by Hanahara et al. in "A Real-Time Processor for the Hough Domain", IEEE Transactions on Pattern Analysis and Machine Intelligence, Vol. 10, No. 1/88, are completely eliminated by the present invention.

The traditional Hough transform is biased in its recognition of lines which align with discrete symmetries of the grid. For example, in a journal article "Natural Representations for Straight Lines and the Hough Transform on Discrete Arrays", IEEE Trans. on PAMI, Vol. 11, pp. 941-950, Sept. 1989 I. D. Svalbe has characterized the degree of bias as a "vote surface" which may be used to compensate the histogram by weighting. As such, this technique adds an extra level of storage and processing. In contradistinction, in the log-Hough transform employed by the invention the vote surface is uniform. There is no slope discretization problem because the log-polar mapping rotationally symmetrizes the image.

In the aforementioned journal article by Duda and Hart there is suggested, and in a journal article by D. H. Ballard entitled "Generalizing the Hough Transform to Detect Arbitrary Shapes", Pattern Recognition, Vol. 13, pp. 111-122, 1981, there are defined generalizations of Hough methods to other families of curves. From the construction in FIGS. 3 and 4, the mirror duality between circles through the origin and straight lines gives an immediate recognition rule for the former: simply substitute log-lines for their mirror images in steps 2' and 4'. In the aforementioned journal article by Chaikin and Weiman it is shown that the log-polar mapping of other conic sections, namely parabolas and hyperbolas, are simply log-lines scaled by 2 and ½. Thus their recognition follows similar steps.

More generally, the recognition of geometric entities which are scaled and rotated is simplified by the log-Hough transform employed by the invention. One aspect of significance of the log-Hough transform is that it enables realtime VLSI implementations which are completely impractical in the Cartesian version. The "in-place" nature of the log-Hough algorithm makes it possible to apply local pixel neighborhood processing such as that suggested by Carver Mead's "silicon retina", as described in "Analog VLSI and Neural Systems", Addison-Wesley, 1989. The use of the invention beneficially eliminates the need for buses to export data off-retina to an external Hough domain.

The VLSI approach suggested above is analogous to the direction-field solutions of differential equations. The candidate point serves as the initial condition; the paths of enabled excitation are the graphical solution. Since log-line templates require no scaling throughout the log-polar domain, nearest neighbor connection patterns can be identically replicated throughout the pixel array. A traditional Hough domain array would have no such architectural stability. Scaling of the sine curve by the factor rho can occur arbitrarily anywhere in the Hough domain. Direction fields for classical Cartesian Hough transforms must be capable of dynamic scaling on a global basis.

The "in-place" and scale invariant template properties of the log-Hough transform may well have significance for the neurophysiological architecture of human vision. The eye-brain (retino-topic) mapping known to be log-polar except for the small foveal region in the center of the field of view. Well known gestalt completion phenomena of perception include the ability to see straight lines in the presence of clutter and obscuration. The "in-place" property of the log-Hough transform enables pattern processing at the site of iconic representation rather than at a separate brain domain. The replicated patterns of ocular dominance columns in the visual cortex are ideally arranged for the direction field solution of log-line templates. The regular arrangement of edge-detector orientations with each column is precisely that which would be required for directionally selective excitation of nearest neighbors (direction field).

Figure 7A:
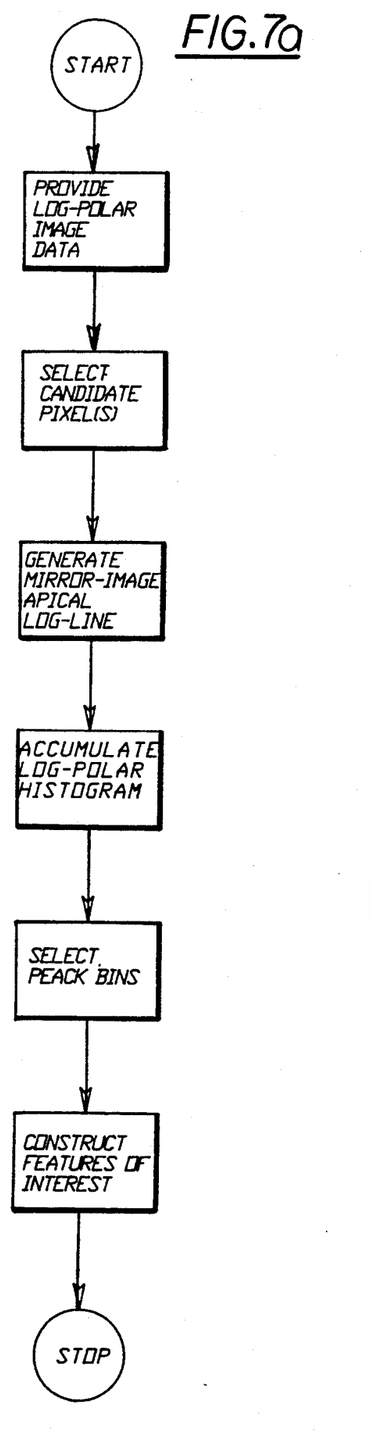
FIG. 7a is a flow chart that illustrates the method of the invention.
Figure 7B:
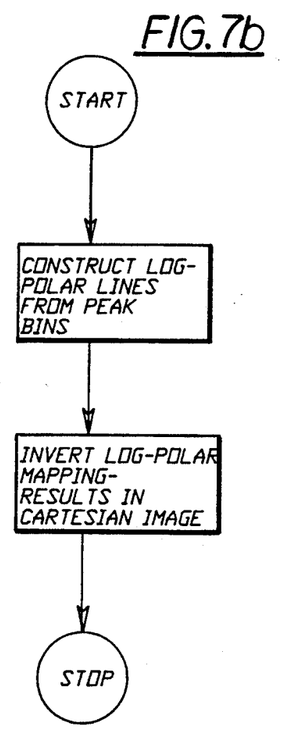

FIG. 7a is a flowchart that illustrates the various steps of the method of the invention. FIG. 7b illustrates in greater detail the steps of the block "Construct Features of Interest" of FIG. 7a.

Figure 8A:
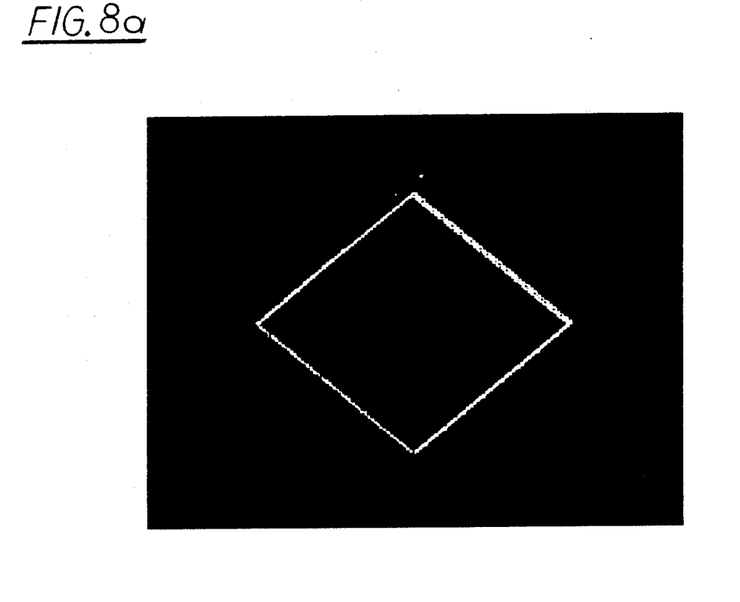
FIG. 8a illustrates an original image presented in the Cartesian domain.
Figure 8B:
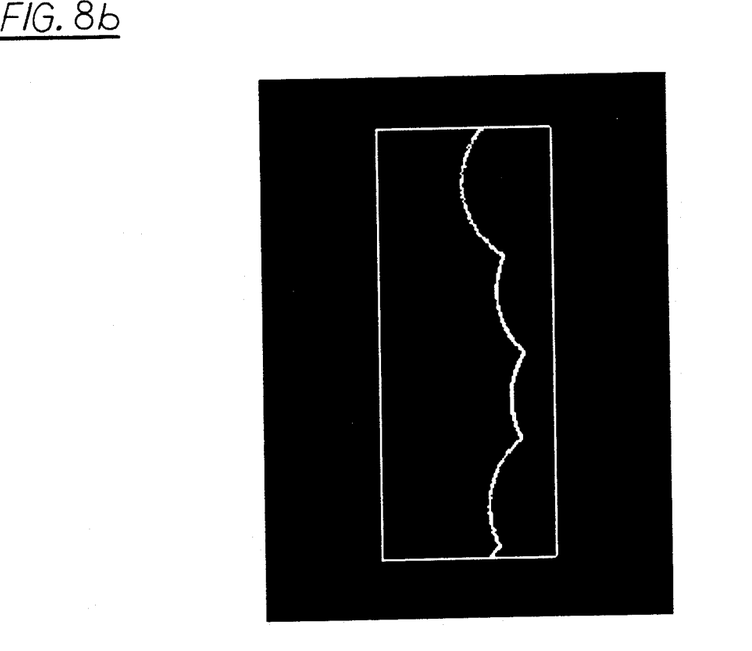
FIG. 8b illustrates the image after a transformation to the Log-polar domain and, in accordance with the invention.
Figure 8C:
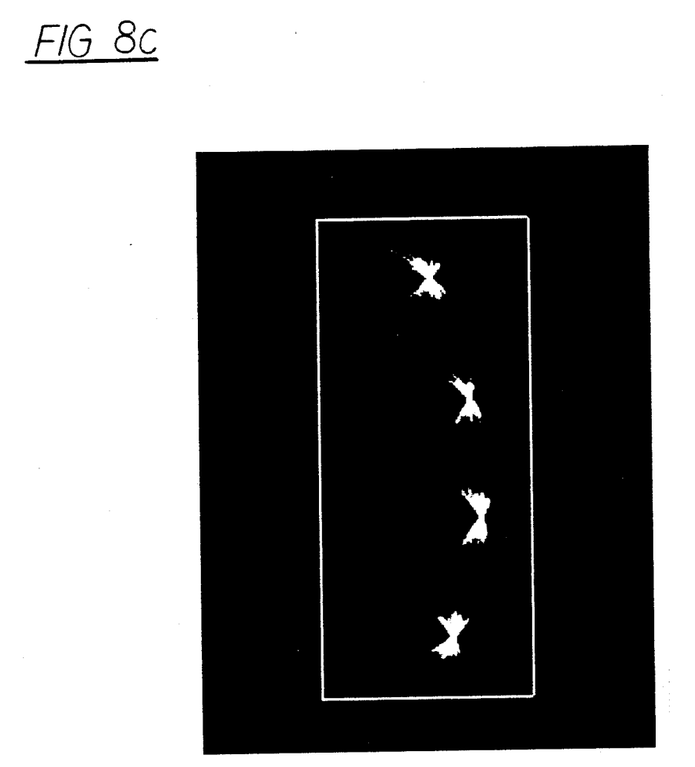
FIG. 8c illustrates the image transformed to the Log-Hough domain.

FIG. 8a illustrates an original image presented in the Cartesian domain, FIG. 8b illustrates the image after a transformation to the Log-polar domain and, in accordance with the invention, FIG. 8c illustrates the image transformed to the Log-Hough domain. In FIG. 8c the bright bins correspond to locations of apexes of log-lines in FIG. 8b, which is the desired result.

Appendix A is a C program listing that accomplishes the method of the invention. This program expresses steps 1' through 4' in software and operates on arrays of data in an image frame store, which is accessed by functions "rpixel[]" and "wpixel []".

Line 3 of the program defines two arrays, 'p[]' and 'q[]', which contain the pixel coordinates of points on a mirror image of a log-line. Line 4 is the beginning of the main program. Lines 6 and 7 show variables. Variables 'p' and 'q' are coordinate locations in the log-polar image shown in FIG. 5a. 'Histogram_offset' is the origin of the Hough Transform Accumulator in video memory. 'Max_sum', 'max_p_address' and 'max_q_address' are used to find the peak in the Hough Transform Accumulator. Lines 10 and 11 are the size of the log-polar image. Line 14 is the first step in the program, it calls 'make_template()' which creates the 'p[]', 'q[]' offset points for the mirror image of a log-line. Line 17 is the grey level threshold which points must exceed to be considered candidate points for the Hough transform. Lines 20 and 21 are the loops which cause the program to consider every point p,q in the log-polar image. Line 25 reads the grey level value of each pixel using the function 'rpixel()'. If the pixel's grey value is above the threshold, then it is considered a candidate point, otherwise the loop continues. Line 26 is a loop which causes the Hough transform accumulator to be incremented for every point on the mirror image log-line associated with the candidate point. Line 34 reads the previous Histogram bin level from video memory using 'rpixel()', line 35 increments the histogram bin, line 37 write the new values back into the Hough Transform Accumulator using the function 'wpixel()'. Lines 41-44 compare the present histogram level with the maximum value detected thus far. Also, these lines store the p,q location of the max value. Line 53 is 'make_template()' which calculates the p,q offsets of the mirror image of a log-line. Line 62 is a loop which causes the program to calculate the offset points for the 180 degrees of a line. Line 64 is the negative of equation (5) in the preceding description. Lines 66 and 67 indicate where the relative offset points of the mirror image of a log-line are calculated and stored. Step 5', not shown, simply includes additional steps of writing into the frame buffer at locations which are offset from the peak bin by p[k], −q[k].

In this regard it can be appreciated that after the histogram is accumulated in the output buffer 12b of FIG. 6 that the circuitry can be redirected by multiplexers and the like to provide the output of the buffer 12b to a threshold detector or similar circuitry for constructing the features of interest (corresponding to step 5' above) which were detected in the log-Hough process. In so far as the Differential Movement LUT 36 holds the mirror-image of a log-line, the log-line itself can be generated by incrementing the U Address Counter 28 when the Differential Movement LUT 36 entry, as expressed on output lines 36a, requests decrementing the Counter 28. This effective reversal of sign along the x-axis can be achieved by the Control Logic 44 which is in a Feature Construction State as opposed to a Feature Recognition State. That is, the construction of a log-line is the mirror image of the construction of the Hough transform. In this further embodiment of the invention the Differential Movement LUT 36 is employed to reverse the sign of the x coordinates. The feature(s) may be constructed within a third buffer memory (not shown) or directed to the input buffer memory 12a to be superimposed upon the original log-polar image. In this manner the invention provides both the recognition of significant extended features and the construction of idealized representations of the recognized features in-place on the input image.

As can be realized, the teaching of the invention may be practiced in a number of different software and hardware embodiments and is not to be construed to be limited to any one particular embodiment. Thus, while the invention has been particularly, shown and described with respect to presently preferred embodiments thereof it will be understood by those skilled in the art that changes in form and details may be made therein without departing from the scope and spirit of the invention.

APPENDIX A

Copyright 1989, Transitions Research Corporation.

```
/* Program to perform log-polar Hough transformation */
int p[64],q[64]; /* storage for mirror log-line template */
main( )
{
    int i, sum, thresh, histogram_offset;
    int p, q, max_sum, max_p_address, max_q_address;
    /* size of log image */
    maxp = 128;
    maxq = 52;
    /* make template for mirror image of a log line */
    make_template( );
    /* detection threshold for a line in log image */
    thresh = 70;
    /* for every point in log image see if it is on a line */
    for(p=0;p<maxp;p++) {
        for(q=;q<maxq;q++) {
        /* STEP 1' */
        /* if point is above threshold it is a candidate point */
        if( rpixel(q,p) > thresh) {
            /* STEP 2' */
            /* for each candidate point, overlay the template */
            for(i=0;i<64;i++) {
                /* STEP 3' */
                /* build the output histogram in video memory */
                /* read old value */
                sum = rpixel(q+q[i]+histogram_offset,
```

APPENDIX A-continued

Copyright 1989, Transitions Research Corporation

```
        p+p[i]-maxp/4);
        sum++;
        /* write new value */
        wpixel(q-q[i]+histogram_offset,p+p[i]-maxp/4,sum);
        /* STEP 4' */
        /* store position of peak of histogram*/
        if(sum > max_sum) {
          max_p_address = p;
          max_q_address = q+histogram_offset;
          max_sum = sum;
        }
       }
      }
     }
    }
}
/* make template for mirror image of point's apical log-line */
make_template( )
{
  double u, v, n, pi;
  int k;
  pi = 3.1415926;
  n = 128.;
  /* find coordiates of points on a mirror image of log line */
  for(k=1;k<(int)n/2;k++) {
    v = pi/(n/2.)*(float)k;
    u = log(sin(v));
    /* offset points of line */
    p[k] = (int)(n/(2.*pi)*v);
    q[k] = (int)(n/(2.*pi)*u);
  }
}
```

What is claimed is:

1. A method of processing image data to detect the presence of an extended feature or features of interest therein, the method comprising the steps of:
   providing an image represented in a logarithmic polar (log-polar) coordinate system;
   selecting image points which are candidates for membership in the feature of interest;
   for each selected image point, constructing a curve in the same logarithmic polar coordinate system as the image, the curve characterizing the locus of possible locations of the feature of interest consistent with the selected image point;
   accumulating a histogram whose bins coincide with points in the same logarithmic polar coordinate system as the image, which bins contain counts of the number of constructed curves intersecting at the location of the bin; and
   selecting bins having greatest counts as representing the locations of definitive points for characterizing the location of the extended feature of interest within the image.

2. A method as set forth in claim 1 and including an additional step of:
   constructing the detected features by marking points in the image, using the locations of the peak bins as a reference point for the construction.

3. A method as set forth in claim 1 where the extended features of interest are curves, including lines.

4. A method as set forth in claim 3 where the curves are straight lines.

5. A method as set forth in claim 4 wherein the step of constructing a curve constructs a curve that is a mirror image of a curve in logarithmic polar coordinates that corresponds to a straight line.

6. A method as set forth in claim 3 where the curves are circles through the origin of the log-polar coordinate system.

7. A method as set forth in claim 6 wherein the step of constructing a curve constructs a curve that is a mirror image of a curve in logarithmic polar coordinates that the corresponds to a circle through the origin of the log-polar coordinate system.

8. A method as set forth in claim 3 where the curves are parabolas or hyperbolas whose focuses are at the origin of the log-polar coordinate system.

9. A method as set forth in claim 1 wherein the step of providing ar image includes a step of capturing an image with a polar exponential sensor array.

10. A method as set forth in claim 1 wherein the step of providing an image includes a step of mapping Cartesian image coordinates to log-polar coordinates by using a hardware address lookup table and an accumulator memory.

11. A method as set forth in claim 1 wherein the step of providing an image includes a step of conducting light from image points through an optic fiber bundle to photosensitive locations in a photosensor chip.

12. A method as set forth in claim 1 wherein the step of selecting image points includes a step of applying a function whose domain is a local neighborhood of a candidate pixel, the process of selection being determined by the value of the function.

13. A method as set forth in claim 6 wherein the step of constructing a curve includes a step of incrementing the contents of a memory array whose elements are addressed by an address generated by the curve construction process.

14. A method as set forth in claim 1 wherein the step of constructing a curve includes a step of incrementing an array variable in a software program, which variable is specified by the curve construction process.

15. Image processing apparatus for detecting the presence of a feature of interest within an image comprising:
   means for providing image data in a log-polar format;
   means for selecting candidate points within the image data;
   means for constructing, for every candidate point, a mirror image of the point's apical log-line;
   means, coupled to the means for constructing, for storing values in bins of a histogram; and
   means for selecting a bin of the histogram having a peak value, the position of the selected bin corresponding to a position of the feature of interest within the image.

16. Image processing apparatus as set forth in claim 15 wherein the means for selecting candidate points within the image includes means for performing an edge detection operation on the image data.

17. Image processing apparatus as set forth in claim 16 wherein the means for performing edge detection includes:
   means for applying an n×m pixel neighborhood operator to the image data; and means for detecting the presence of image pixels having a value equal to or greater than a predetermined threshold value.

18. A method of processing a set of multi-dimensional data elements so as to detect an extended feature or features of interest, each feature being comprised of a plurality of the multi-dimensional data elements, comprising the steps of:
   providing a representation of the multi-dimensional data elements in a logarithmic-polar coordinate system;

selecting multi-dimensional data elements that are candidates for membership in the feature of interest;

for each selected multi-dimensional data element, constructing a curve in the same logarithmic-polar coordinate system as that in which the multi-dimensional data element is represented, the curve characterizing a locus of possible locations of the feature of interest, consistent with the selected multi-dimensional data element;

accumulating a histogram having bins that coincide with points int the same logarithmic-polar coordinate system as the representation of the multi-dimensional data elements, which bins contain counts of the number of constructed curves intersecting at the location of the bin; and selecting bins having greatest counts as representing parameters that characterize the extended feature or features of interest.

19. A method as set forth in claim 18 wherein the step of providing a representation of the multi-dimensional data elements in log-polar format includes a step of viewing an environment with an image sensor array means constructed to generate image data in log-polar format.

20. A method as set forth in claim 19 wherein the method of processing a set of multi-dimensional elements is accomplished locally within the image sensor array means.

21. A method as set forth in claim 19 wherein the feature of interest is selected from the group consisting of straight lines, curved lines, conic sections and combinations thereof.

22. A method as set forth in claim 18 wherein the step of providing includes a step of mapping non-log-polar coordinates to log-polar coordinates using a look-up table means.

23. A method as set forth in claim 18 wherein the step of selecting multi-dimensional data elements includes a step of applying a function whose domain is a local neighborhood of a multi-dimensional data element, the process of selecting being determined by the value of the function.

24. Apparatus for processing a set of multi-dimensional data elements so as to detect an extended feature or features of interest, each feature being comprised of a plurality of the multi-dimensional data elements, comprising:

means for providing a representation of the multi-dimensional data elements in a logarithmic-polar coordinate system;

means for selecting multi-dimensional data elements that are candidates for membership in the feature of interest;

means for constructing, for each selected multi-dimensional data element, a curve in the same logarithmic-polar coordinate system as that in which the multi-dimensional data element is represented, the curve being constructed so as to characterize a locus of possible locations of the feature of interest, consistent with the selected multi-dimensional data element;

means for accumulating a histogram having bins that coincide with points in the same logarithmic-polar coordinate system as the representation of the multi-dimensional data elements, which bins contain counts of the number of constructed curves intersecting at the location of the bin; and means for selecting bins having greatest counts as representing parameters that characterize the extended feature or features of interest.

25. Apparatus as set forth in claim 24 wherein the means for providing the multi-dimensional data elements in the log-polar format includes image sensor means constructed to generate image data in the log-polar format.

* * * * *